(12) United States Patent
Yamamoto

(10) Patent No.: US 8,344,583 B2
(45) Date of Patent: Jan. 1, 2013

(54) SLIP RING COVER FOR AUTOMOTIVE ALTERNATOR

(75) Inventor: Tomonori Yamamoto, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 102 days.

(21) Appl. No.: 12/917,212

(22) Filed: Nov. 1, 2010

(65) Prior Publication Data

US 2011/0291505 A1 Dec. 1, 2011

(30) Foreign Application Priority Data

May 26, 2010 (JP) ................. 2010-120375

(51) Int. Cl.
*H02K 13/00* (2006.01)
*H02K 5/00* (2006.01)
*H01R 39/08* (2006.01)
*H01R 39/00* (2006.01)

(52) U.S. Cl. ........... 310/239; 310/89; 310/232; 310/235
(58) Field of Classification Search ............... 310/89, 310/232, 239, 235
See application file for complete search history.

(56) References Cited

U.S. PATENT DOCUMENTS

| | | | | |
|---|---|---|---|---|
| 5,550,418 A | * | 8/1996 | Chung | 310/239 |
| 7,417,353 B2 | * | 8/2008 | Wada et al. | 310/239 |
| 2002/0140314 A1 | * | 10/2002 | Tsuge | 310/239 |
| 2005/0280330 A1 | | 12/2005 | Mashino | |
| 2008/0061652 A1 | * | 3/2008 | Yamamuro et al. | 310/228 |

FOREIGN PATENT DOCUMENTS

| | | | |
|---|---|---|---|
| JP | 62-6830 Y2 | | 2/1987 |
| JP | 63154042 A | * | 6/1988 |
| JP | 7-213035 A | | 8/1995 |
| JP | 07213035 A | * | 8/1995 |
| JP | 2002-359951 A | | 12/2002 |
| JP | 2006-006000 A | | 1/2006 |
| JP | 4265571 B2 | | 2/2009 |

OTHER PUBLICATIONS

Japanese Communication dated Apr. 24, 2012 issued in Japanese Application No. 2010-120375.

* cited by examiner

*Primary Examiner* — Quyen Leung
*Assistant Examiner* — Jose Gonzalez Quinones
(74) *Attorney, Agent, or Firm* — Sughrue Mion, PLLC

(57) ABSTRACT

Provided is an automotive alternator having structure for preventing entry and discharging of foreign matters irrespective of a posture of a brush unit, to thereby allow normalization of the brush unit. The brush unit of the automotive alternator includes a slip ring, a brush, a brush holder, and a slip ring cover coaxially spaced from the slip ring and having an inner peripheral surface surrounding substantially an entire periphery of the slip ring. The inner peripheral surface of the slip ring cover has a tapered surface increasing in diameter from a first end on the frame side toward a second end having a fully-open opening. The fully-open opening is sealed by a sealing member that forms a labyrinth seal with the second end.

11 Claims, 6 Drawing Sheets

SLIP RING COVER FOR AUTOMOTIVE ALTERNATOR

BACKGROUND OF THE INVENTION

1. Field of the Invention

The present invention relates to an automotive alternator mounted on a car, truck, or the like, and more particularly, to an automotive alternator including a brush unit with an improved discharge mechanism.

2. Description of the Related Art

A conventional automotive alternator generally includes: a slip ring provided on a rotation shaft of a rotor supported by a frame; a brush held in sliding contact with the slip ring; a brush holder for elastically pushing and holding the brush against the slip ring with a spring; and a substantially hollow cylindrical slip ring cover having an end attached to the frame to be coaxially spaced from the slip ring and surrounding substantially the entire periphery of the slip ring. Therefore, foreign matters such as water and oil are prevented from entering a slide portion between the slip ring and the brush. Further, in order to discharge water or the like having entered the slip ring cover, a discharge port is formed at a bottom in a gravitational direction of the slip ring cover (see, for example, Japanese Patent Application Laid-open Nos. 2002-359951 and 2006-6000).

In the above-mentioned conventional automotive alternator, the discharge port of the slip ring cover needs to be provided at the bottom. Therefore, parts having the same function as the brush units but having different positional relationships of the discharge port relative to the brush holder must be prepared so that the discharge port may be provided at the bottom when the brush holder is attached in different postures. This leads to a problem of increased number of models and parts.

In a case where the brush is pushed up when mounted in a vehicle, the structure of the brush unit disclosed in Japanese Patent Application Laid-open No. 2002-359951 cannot prevent the entry of foreign matters. Japanese Patent Application Laid-open No. 2006-6000 discloses a brush unit that prevents the entry of foreign matters for only the case where the brush is pushed up, but the structure does not support cases other than the case where the brush is pushed up.

SUMMARY OF THE INVENTION

It is therefore an object of the present invention to provide an automotive alternator having structure for preventing foreign matters from entering inside irrespective of a posture of a brush unit and for discharging even if water or the like enters, to thereby allow normalization of the brush unit.

According to the present invention, there is provided an automotive alternator including: a slip ring provided on a rotation shaft of a rotor supported by a frame; a brush held in sliding contact with the slip ring; a brush holder for elastically pushing and holding the brush against the slip ring; and a slip ring cover having a first end attached to the frame to be coaxially spaced from the slip ring, and an inner peripheral surface surrounding substantially an entire periphery of the slip ring, in which: the inner peripheral surface of the slip ring cover has a tapered surface increasing in diameter from the first end toward a second end; the slip ring cover has a fully-open opening at the second end; and the fully-open opening of the slip ring cover is sealed by a sealing member that forms a labyrinth seal with the second end.

According to the apparatus of the present invention, there may be provided an automotive alternator having structure for preventing foreign matters from entering inside irrespective of a posture of a brush unit and for discharging even if water or the like enters, to thereby allow normalization of the brush unit.

DETAILED DESCRIPTION OF THE PREFERRED EMBODIMENTS

Figure 1:
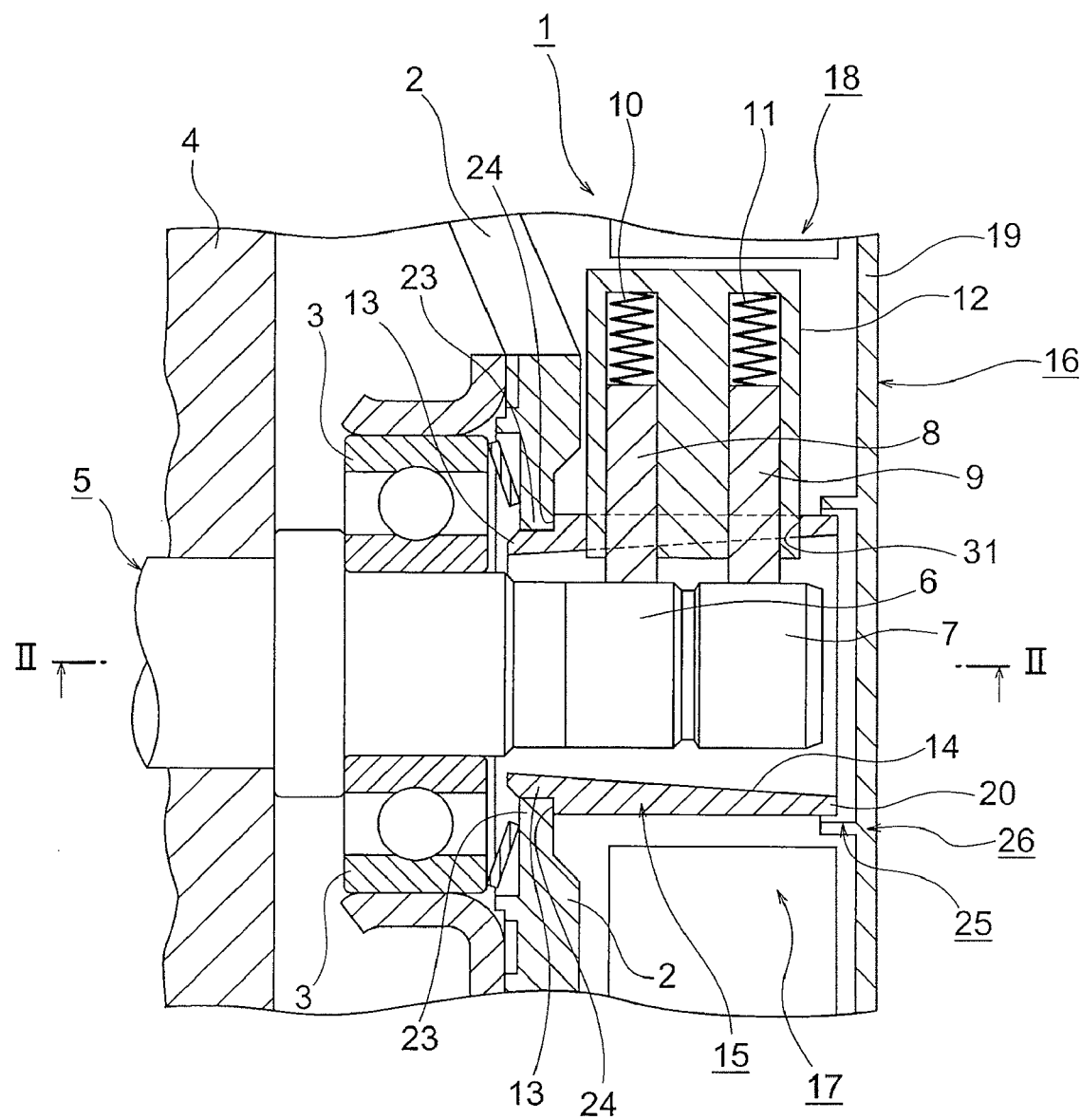
FIG. 1 is a cross-sectional view illustrating a brush unit for an automotive alternator according to a first embodiment of the present invention.

Hereinafter, in order to describe the present invention in more detail, embodiments of the present invention are described with reference to the accompanying drawings. Note that, throughout the drawings, the same or corresponding parts are denoted by the same reference numerals and symbols, and their duplicate description is simplified or omitted as appropriate.

First Embodiment

Figure 2:
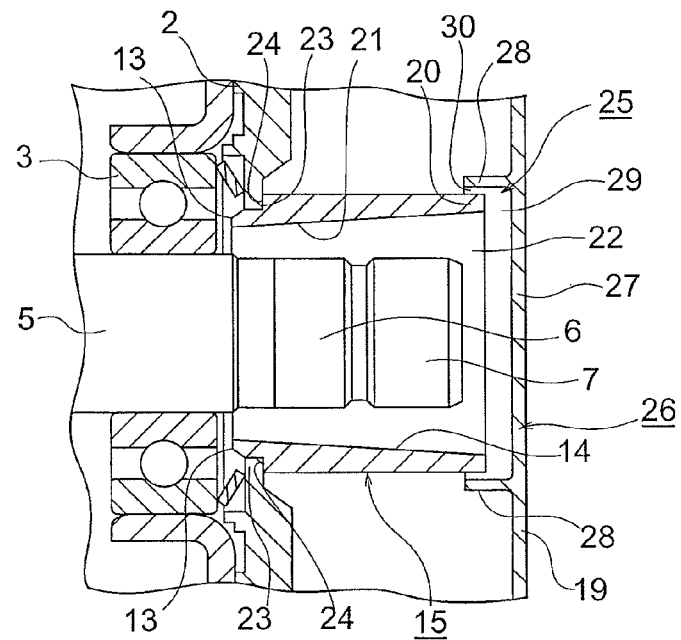
FIG. 2 is a cross-sectional view taken along the line II-II of FIG. 1.

FIGS. 1 and 2 illustrate an automotive alternator 1 according to the present invention, including: slip rings 6 and 7 provided on a rotation shaft 5 of a rotor 4 rotatably supported by a frame 2 via a bearing 3; brushes 8 and 9 held in sliding contact with the slip rings 6 and 7, respectively; a brush holder 12 for elastically pushing and holding the brushes 8 and 9 against the slip rings 6 and 7 with springs 10 and 11; and a slip ring cover 15 having a first end 13 attached to the frame 2 to be coaxially spaced from the slip rings 6 and 7, and an inner peripheral surface 14 surrounding substantially the entire periphery of the slip rings 6 and 7. These parts, that is, the brushes 8 and 9, the springs 10 and 11, the brush holder 12, and the slip ring cover 15 constitute a brush unit 16. The frame 2 also supports a rectifier 17, an integrated circuit (IC) regulator 18, and the like near the brush unit 16 and the slip ring cover 15. The entire apparatus is covered by a rear cover 19 attached to the frame 2.

Figure 3:
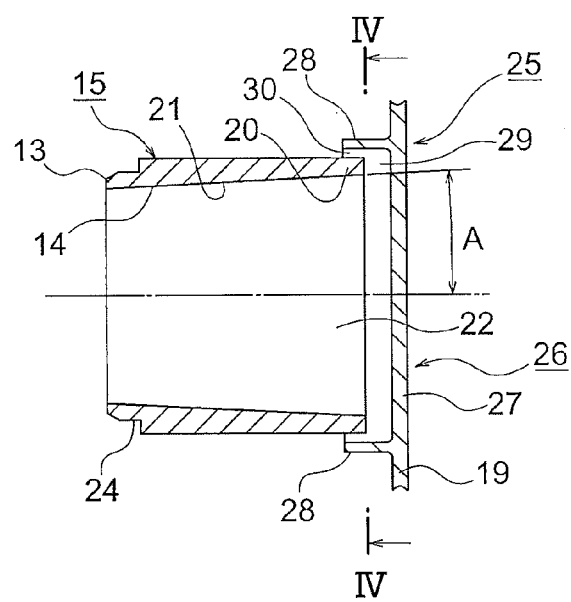
FIG. 3 is a cross-sectional view illustrating only a slip ring cover and a sealing member of FIG. 2.
Figure 4:
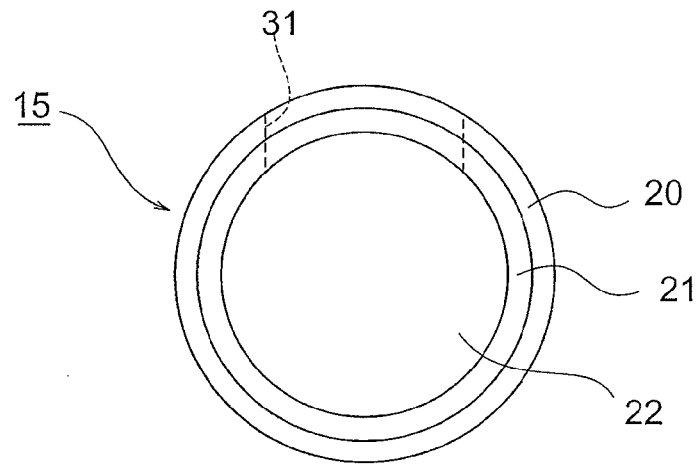
FIG. 4 is a front view taken along the line IV-IV of FIG. 3 with the sealing member being removed.
Figure 5:
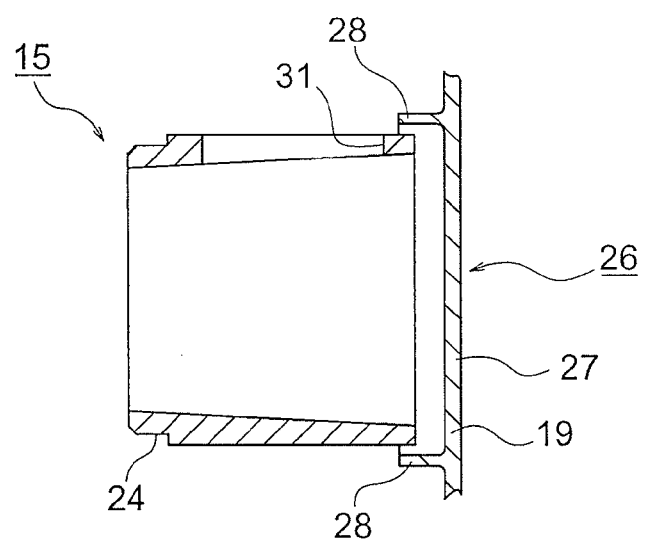
FIG. 5 is a cross-sectional view illustrating the slip ring cover and the brush holder in an assembled state.

As illustrated in FIGS. 3 to 5, the inner peripheral surface 14 of the slip ring cover 15 according to the present invention has a tapered surface 21 of a taper angle A increasing in diameter from the first end 13 on the side of the slip ring cover 15 to be attached to the frame 2 toward a second end 20. The slip ring cover 15 includes a fully-open opening 22 at the second end 20. In the illustrated example, the slip ring cover 15 is a hollow cylindrical member with a constant outer diameter in its entirety, and both the first end 13 and the second end 20 are circular open ends.

The first end 13 includes an annular notch groove 24. The annular notch groove 24 abuts an inner surface and a side surface of an inner edge 23 of the circular opening formed in the frame 2. Therefore, the first end 13 is fitted to the inner edge 23 to be positioned and supported, and forms a kind of labyrinth seal structure in which the angles of the fitting surfaces are substantially perpendicular to each other. The tapered surface 21 extends so as to gradually increase in inner diameter at a constant taper angle from the first end 13 to the second end 20. Therefore, the thickness of the slip ring cover 15 is smaller at the second end 20 than at the first end 13.

The opening 22 at the second end 20 of the slip ring cover 15 is sealed by a sealing member 26 erected from an inner surface of the rear cover 19 to form a labyrinth seal 25 with the second end 20. The sealing member 26 includes: an end-plate portion 27 that is a part of the rear cover 19, which faces and is spaced from the opening 22 in an axial direction; and a flange portion 28 extending from the end-plate portion 27, which faces and is spaced from the second end 20 in a radial direction so as to surround the second end 20, to thereby form structure in a shape of a circular shallow plate or pan in its entirety. Thus, the second end 20 of the slip ring cover 15 forms an axial clearance 29 from the end-plate portion 27 of the sealing member 26, and a radial clearance 30 from the flange portion 28 of the sealing member 26. Therefore, the labyrinth seal 25 is formed by the axial clearance 29 and the radial clearance 30 between the second end 20 of the slip ring cover 15 and the sealing member 26.

The sealing member 26 may be supported by the rear cover 19 or the frame 2 as illustrated, or by the brush holder 12. Alternatively, the sealing member 26 may be supported by a rib-like coupling member for coupling the second end 20 of the slip ring cover 15 and the flange portion 28 of the sealing member 26.

In FIG. 5, a fitting hole 31 is provided in an upper surface of the slip ring cover 15. The brush holder 12 is fitted into the fitting hole 31 to be positioned and held at a predetermined position. Though not illustrated, as is well known to those skilled into the art, the brush holder 12 has a mounting flange through which a mounting screw passes to be screwed to the frame 2, and is supported by the frame 2.

According to the automotive alternator structured as above, foreign matters are prevented from entering from the opening of the slip ring cover 15. Even if water or the like enters by penetration through a minute gap into the brush unit 16 or the slip ring cover 15, the water always flows from one end to the other end and out of the slip ring cover 15. Therefore, the slip ring cover 15 has structure for discharging water or the like irrespective of the direction in which the brushes 8 and 9 are pushed (vehicle-mounted state). This eliminates the need for changing the position of the discharge port depending on the direction in which the brushes are pushed (vehicle-mounted state) and hence the need for increasing the number of models, to thereby allow standardization into one model. Therefore, not only the production cost may be reduced, but also the parts control and assembling efficiency may be improved.

Second Embodiment

Figure 6:
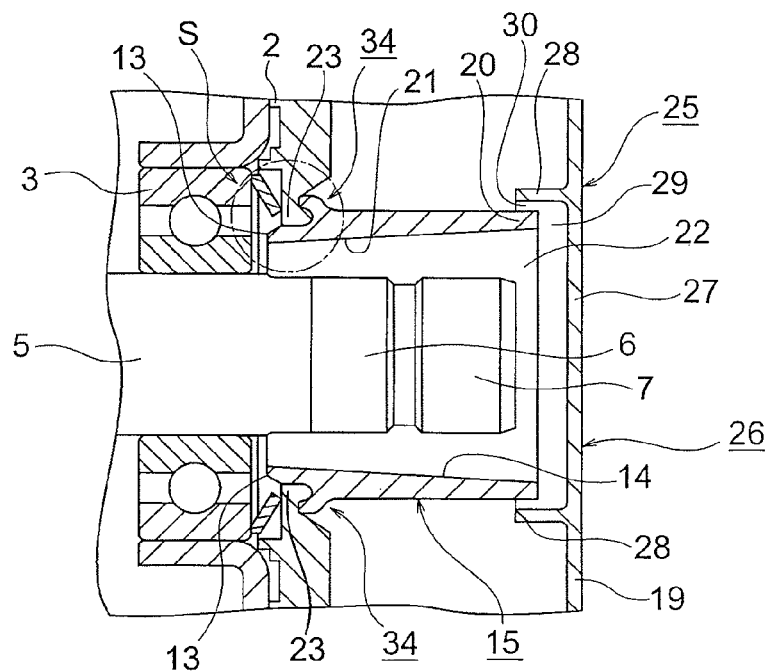
FIG. 6 is a cross-sectional view similar to FIG. 2, illustrating an automotive alternator according to a second embodiment of the present invention having labyrinth seal structure between a frame and a slip ring cover.
Figure 7:
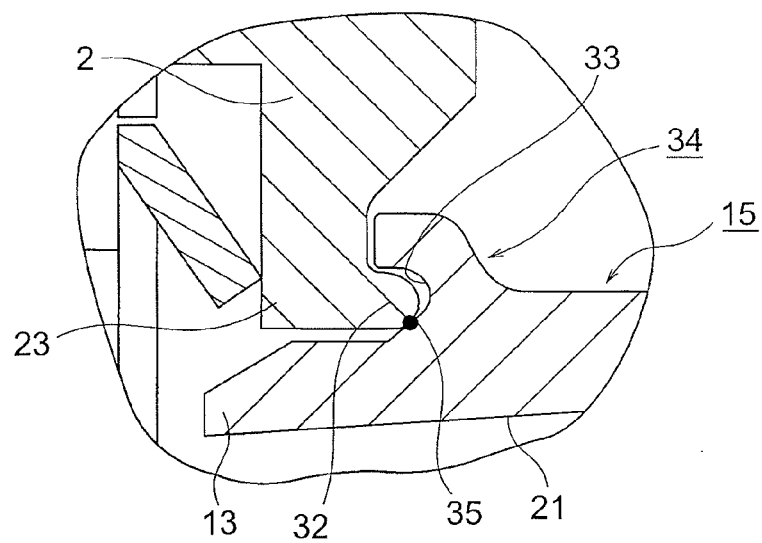
FIG. 7 is an enlarged view of a part enclosed by the circle S of FIG. 6.

FIGS. 6 and 7 illustrate an automotive alternator, in which a first end 13 of a slip ring cover 15 has labyrinth seal structure 34 in which an annular projecting portion 32 and an annular groove portion 33 are meshed together at a fitting portion with a frame 2. The labyrinth seal structure 34 also includes at least one annular contact portion 35 formed between the annular projecting portion 32 and the annular groove portion 33.

By thus providing a part that forms the annular groove portion 33 at the first end 13 (on the side of the start point of the inclined surface) of the slip ring cover 15 and meshing the annular projecting portion 32 of the frame 2 with the annular groove portion 33 to form the positive labyrinth seal structure 34 with the frame 2, water resistance may be improved over the fitting structure illustrated in FIG. 2. In the structure illustrated in FIG. 2, a kind of labyrinth seal structure is formed between the first end 13 of the slip ring cover 15 and the inner edge 23 of the frame 23, in which the angles of the fitting surfaces between the annular notch groove 24 and each of the inner surface and the side surface of the inner edge 23 of the circular opening of the frame 2 are substantially perpendicular to each other. However, the simple labyrinth shape in the first embodiment is more prone to penetration than the labyrinth seal structure 34 in the second embodiment, when water remains in the seal portion or the fitting portion between the brush holder 12 and the slip ring cover 15.

Further, as illustrated in FIG. 7, the at least one annular contact portion 35 formed between the annular projecting portion 32 and the annular groove portion 33 may further improve water resistance and be used for positioning in assembling the brush unit 16 to the frame 2.

Third Embodiment

Figure 8:
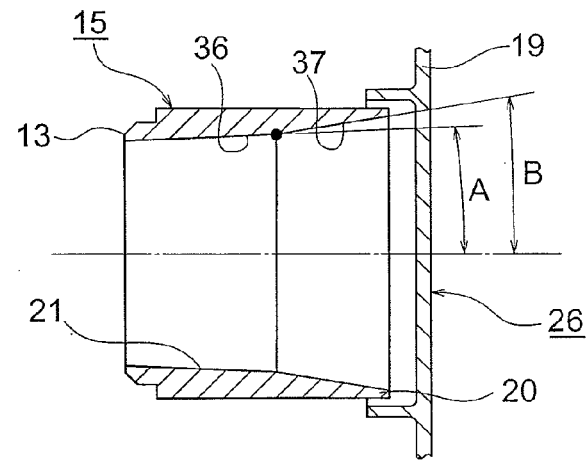
FIG. 8 is a cross-sectional view similar to FIG. 3, illustrating a slip ring cover of an automotive alternator according to a third embodiment of the present invention.

FIG. 8 illustrates a slip ring cover 15 of an automotive alternator, which has a tapered surface 21 including, for example, a first taper portion 36 of a first taper angle A, and a second taper portion 37 of a second taper angle B. The first taper portion 36 on the first end 13 side of the slip ring cover 15 changes in the middle to have the taper angle B, which is larger than the taper angle A, on the second end 20 side. Therefore, discharging property for water or the like may be improved without increasing an outer diameter of the slip ring cover 15.

Fourth Embodiment

Figure 9:
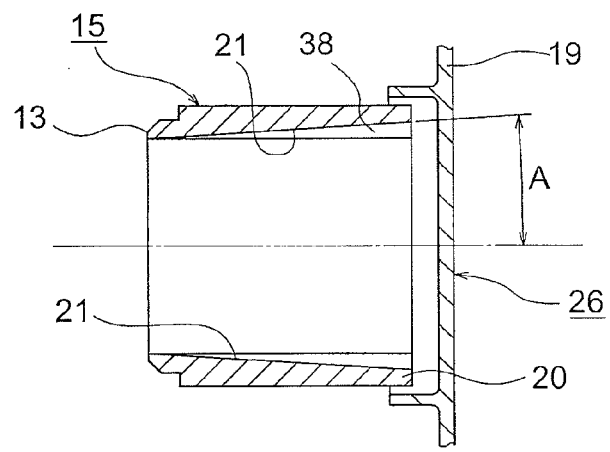
FIG. 9 is a cross-sectional view similar to FIG. 3, illustrating a slip ring cover of an automotive alternator according to a fourth embodiment of the present invention.
Figure 10:
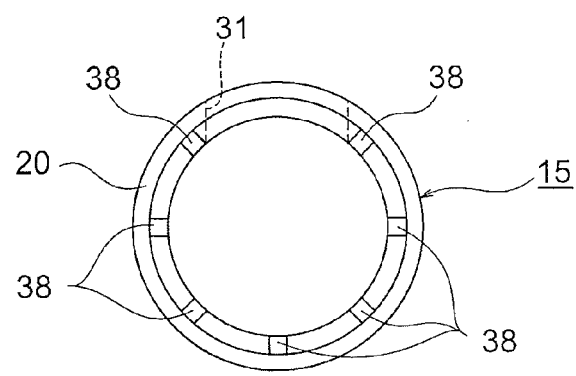
FIG. 10 is a front view similar to FIG. 4, illustrating the slip ring cover of FIG. 9.

FIGS. 9 and 10 illustrate a slip ring cover 15 including a plurality of rib portions 38 protruding radially inward from a tapered surface 21 and extending in an axial direction. By thus providing the rib portions 38 on the tapered surface 21, a side surface of the rib portions 38 may be used as a discharge guide.

Fifth Embodiment

Figure 11:
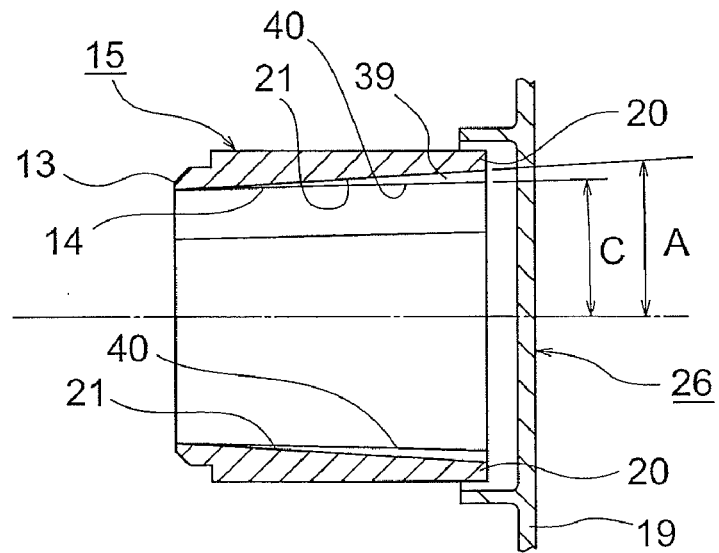
FIG. 11 is a cross-sectional view similar to FIG. 3, illustrating a slip ring cover of an automotive alternator according to a fifth embodiment of the present invention.
Figure 12:
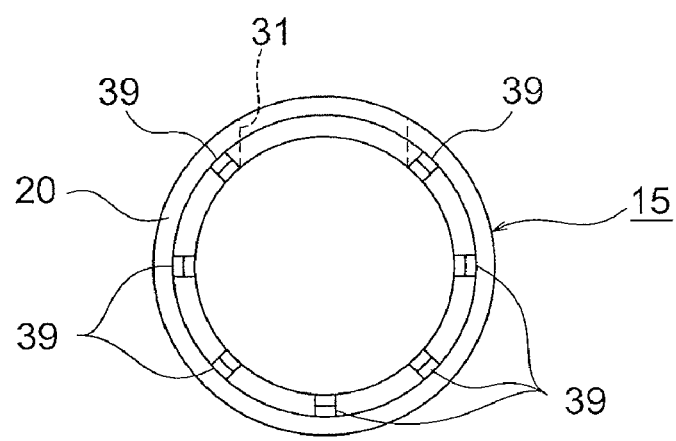
FIG. 12 is a front view similar to FIG. 4, illustrating the slip ring cover of FIG. 11.

FIGS. 11 and 12 illustrate a slip ring cover 15, in which an inner peripheral surface of each of rib portions 39 has a tapered surface 40 gradually increasing in diameter from a first end 13 toward a second end 20 of the slip ring cover 15. By providing the rib portions 39 having the tapered surface 40 as described above, a side surface of each of the rib portions 39 may be used as a discharge guide, and in addition a discharging effect of the tapered surface 40 may improve a discharging property.

The apparatus that have been described above with reference to the drawings are merely examples and various modifications may be made thereto. Further, all features of the respective specific examples may be used or some of the features may be selectively used in combination. For example, the brush holder 12 and the slip ring cover 15 may be integrated as a single continuous part and formed by molding or the like. Further, the sealing member 26 may be supported by the rear cover 19 or the frame 2 as illustrated, or by the brush holder 12. Alternatively, the sealing member 26 may be supported by a rib-like or spoke-like coupling member for coupling the second end 20 of the slip ring cover 15 and the flange portion 28 of the sealing member 26.

The present invention may be applied for an automotive alternator.

What is claimed is:

1. An automotive alternator, comprising:
   a slip ring provided on a rotation shaft of a rotor supported by a frame;
   a brush held in sliding contact with the slip ring;
   a brush holder for elastically pushing and holding the brush against the slip ring; and
   a slip ring cover having a first end attached to the frame to be coaxially spaced from the slip ring, and an inner peripheral surface surrounding substantially an entire periphery of the slip ring, wherein:
   the inner peripheral surface of the slip ring cover has a tapered surface increasing in diameter from the first end toward a second end;
   the slip ring cover has a fully-open opening at the second end; and
   the fully-open opening of the slip ring cover is sealed by a sealing member that forms a labyrinth seal with the second end.

2. An automotive alternator according to claim 1, wherein the tapered surface has a constant taper angle from the first end to the second end.

3. An automotive alternator according to claim 1, wherein the tapered surface includes a first taper portion having a first taper angle and a second taper portion having a second taper angle.

4. An automotive alternator according to claim 1, wherein the slip ring cover includes a plurality of rib portions protruding radially inward from the tapered surface and extending in an axial direction.

5. An automotive alternator according to claim 4, wherein an inner peripheral surface of each of the plurality of rib portions has a tapered surface increasing in diameter from the first end toward the second end of the slip ring cover.

6. An automotive alternator according to claim 1, wherein the first end of the slip ring cover forms a labyrinth seal structure with the frame, in which an annular projecting portion and an annular groove portion are meshed together.

7. An automotive alternator according to claim 6, wherein the labyrinth seal structure includes at least one annular contact portion between the annular projecting portion and the annular groove portion.

8. An automotive alternator according to claim 1, wherein the sealing member for sealing the fully-open opening of the slip ring cover includes:
   an end-plate portion which faces and is spaced from the fully-open opening in an axial direction; and
   a flange portion extending from the end-plate portion, which faces and is spaced from the second end in a radial direction so as to surround the second end.

9. An automotive alternator according to claim 1, wherein the second end of the slip ring cover extends beyond an end of the rotation shaft.

10. An automotive alternator according to claim 1, wherein the fully-open opening has a diameter larger than a diameter of the inner peripheral surface at the second end.

11. An automotive alternator according to claim 1, wherein the inner peripheral surface at the second end defines the fully-open opening.

* * * * *